June 27, 1967 H. P. EHRENFREUND ET AL 3,327,750
EGG BREAKING DEVICE
Filed Aug. 21, 1964 3 Sheets-Sheet 1

INVENTOR.
LESLIE WILLIAM DRIGGS
HAROLD PAUL EHRENFREUND
BY
*Walter F. Wessendorf Jr.*
*Attorney*

June 27, 1967  H. P. EHRENFREUND ET AL  3,327,750
EGG BREAKING DEVICE
Filed Aug. 21, 1964  3 Sheets-Sheet 2
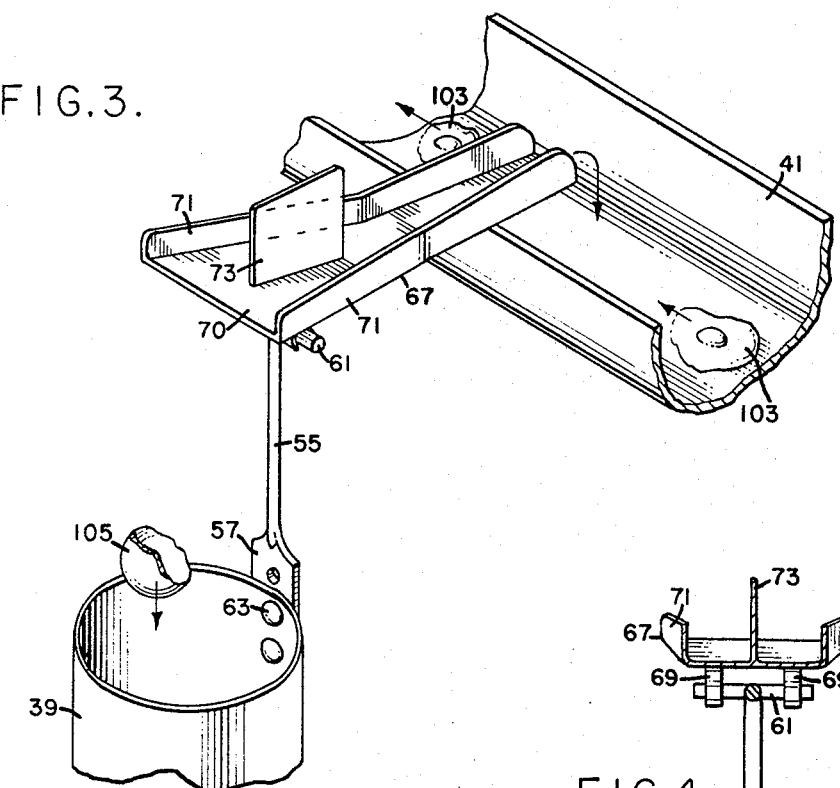
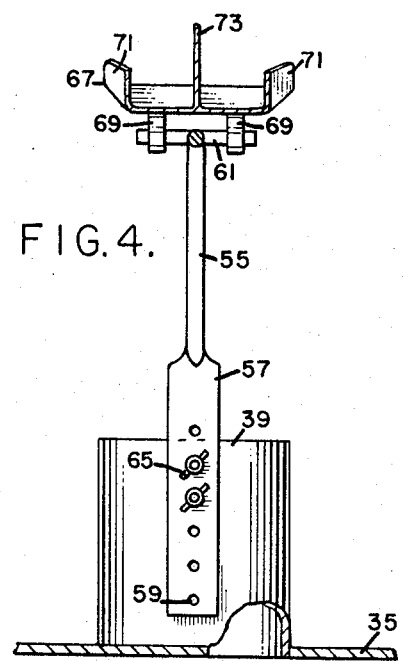
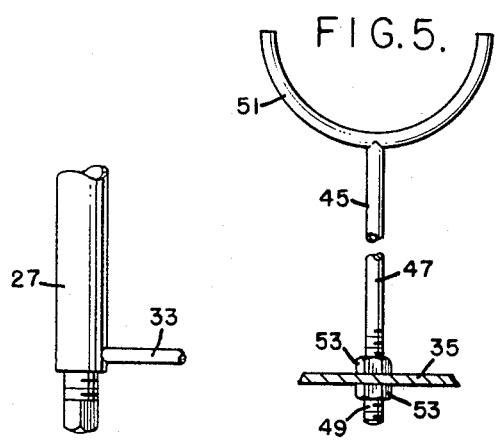
INVENTOR.
LESLIE WILLIAM DRIGGS
HAROLD PAUL EHRENFREUND
BY
*Walter F. Wassendorf Jr.*
*attorney*

June 27, 1967  H. P. EHRENFREUND ET AL  3,327,750
EGG BREAKING DEVICE

Filed Aug. 21, 1964  3 Sheets-Sheet 3

INVENTOR.
LESLIE WILLIAM DRIGGS
HAROLD PAUL EHRENFREUND
BY
Walter J. Wessendorf Jr
attorney United States Patent Office 3,327,750
Patented June 27, 1967

3,327,750
EGG BREAKING DEVICE
Harold Paul Ehrenfreund, Eagle Bridge, and Leslie William Driggs, West Sand Lake, N.Y., assignors to Owl Kill Farm, Inc., White Creek, N.Y., a corporation of New York
Filed Aug. 21, 1964, Ser. No. 391,264
8 Claims. (Cl. 146—2)

ABSTRACT OF THE DISCLOSURE

Egg breaking apparatus is provided which includes a work table having a plurality of work stations around it together with a plurality of egg breaking trays. An egg receiving trough is positioned between the trays for receiving broken eggs therefrom, and the trough is inclined to convey the eggs to an outlet end of the trough. The apparatus also includes a waste disposal chute located at each work station, and a common hopper receives waste disposal from all chutes. An auger means in the bottom of the hopper functions to remove accumulated wastes from the hopper. The apparatus may also include an inspector's table in communication with the egg receiving trough. Also, an improved egg breaking tray is provided, and the tray is constructed to permit more efficient breaking and inspection of eggs. The tray includes a vertically disposed knife blade which is permanently secured to the tray, and the blade is disposed along a longitudinal axis of the tray and perpendicular to the working position of an operator. The tray includes spring clips on its underside so that the tray can be tilted relative to, and also removed from, its mounted position at the work table.

---

This invention relates to an egg breaking device and process.

The problems in the art to which this invention pertains are the needs for an egg breaking device and process for the small and medium-size egg breaking plants which not only considers, but also structurally incorporates and embodies in said device and process, the principles of work simplification and motion economy.

To place this invention and its contributions in the art in proper perspective, a discussion of the prior art will best subserve this purpose. Inasmuch as the breaking operation is the criterion for plant production, the entire volume of the plant depends on the speed of this operation. The two types of egg breaking equipment in common use are hand breaking and automatic machines. Both types are necessary to the industry; however, the systems now available do not fill the total needs. In addition, each system has disadvantages while neither of the systems meets the needs of the medium-size egg breaking plant. It must be pointed out that all breaking operations must be serviced with the raw product, i.e. shell eggs, and the product, i.e. the broken eggs, must be packaged; thus, only those operations directly connected with breaking, broken shell removal and getting the product into a receiving structure are taken into consideration in this discussion. The brief discussion of the HAND BREAKING and MACHINE OR AUTOMATIC SYSTEMS follows.

Hand Breaking

Several firms are engaged in the business of supplying hand breaking equipment. Nevertheless, all such equipment follows a rather general pattern. The equipment consists of a rectangular stainless steel or galvanized table with usually four work stations provided for the individual operators who break the eggs. There are two evenly spaced holes through the center of the breaking table for purposes of broken shell disposal. At each of the four work stations there are an egg breaking tray, knife, Canadian egg breaking tray, a cup and a stainless steel bucket. The breaking knife is perpendicular to the individual operator and the Canadial egg breaking tray horizontally disposed such that flow of the broken egg product is directed either to the right or left into a bucket. Shell eggs in filler flats are stacked on the table on one side of the breaking knife opposite the bucket. The minimum purchase price for this type of equipment is approximately $400.00 in accordance with current price quotations. This price does not include shell disposal receptacles nor any of the other equipment necessary for an egg breaking plant. This system violates principles of work simplification and motion economy among which are some of the following:

A. Hand travel distance in the repetitious operation of breaking eggs is excessive;

B. The shell eggs are grasped with only one hand and then transferred to the other hand for breaking because of this limitation of the structurally embodied system;

C. When the stainless steel bucket is full of broken eggs, the operator must pick up the bucket, make a 90 degree turn, walk some distance to pour the broken eggs from the bucket into a receptacle, then the operator must about-face or make a 180 degree turning movement therefrom and thereat for return to the work station for resumption of the egg breaking operation;

D. The number of pieces of breaking equipment to be washed, sanitized and assembled includes the knife, tray rack, grid, Canadian breaking tray, bucket, cup and is therefore excessive;

E. Several bloody eggs are broken in the course of an hour's egg breaking operation requiring the individual operator in each instance to tip the Canadian breaking tray, catch the bloody egg in a cup, and dispose of the cup's contents in the broken shell disposal hole or some other receptacle;

F. In the event the operator breaks a spoiled shell egg the time that is required for washing, sanitizing and assembly of the breaking equipment by the individual operator is excessive;

G. The disposal of broken egg shells, both individual and collective with reference to the individual operator is unsanitary and time consuming, and because the broken shell disposal hole is centrally located for the individual operators, their hands must travel excessive distances to effect disposals of each one of the broken egg shells;

H. Every few minutes an operator must discontinue the egg breaking operation to grasp a shell tamper for crushing the broken egg shells which collect in a barrel or other receptacle positioned for such purpose beneath the broken shell disposal hole, and after the operation of crushing the broken egg shells is completed, the operator must make a turn, walk to a sink to wash his hands, and return to his work station for resumption of the egg breaking operation.

One can easily discern the reason why a plant utilizing the hand breaking system of the most advantageous prior art equipment heretofore described with four individual operators breaking eggs in an 8-hour shift will average 3,000 lbs. of broken eggs, and rarely 4,000 lbs.

Machine or automatic breaking

Several types of this kind of equipment are being manufactured by several companies, and one of these companies claims that 40% of the total eggs currently broken commercially in the United States are broken on this company's equipment. Inasmuch as this company's equipment is generally similar to the equipment manufactured by the other companies, a general discussion of the equipment will be generally applicable to the several companies. The equipment is very good for the purposes intended and has the advantage of providing an efficient means for separating the whites and yolks from broken shell eggs when these operations are required. However, the equipment does have distinct disadvantages, especially for the medium-size plant. The equipment is expensive and most egg breaking plants do not have sufficient volume to warrant the expense of purchase or rental, installation and maintenance of such equipment. In addition to the servicing and packaging operations required as in the case when hand breaking equipment is utilized, the small model of the automatic equipment still requires two operators for a daily production of 6,000 lbs. of broken eggs. Restricting this discussion to the small model of the automatic equipment, among the disadvantages are the following:

A. The equipment may not be purchased and has a minimum rental of $4,800 per annum based upon minimum production of 800,000 lbs. of eggs;

B. The equipment has necessarily many moving parts requiring the entire system to be closed down in the event of minor repairs, and considerable lost production time in the event of major repairs;

C. The size of the equipment, the number of moving cups and other related parts necessitate a considerable number of man hours for daily sanitation and clean-up;

D. The lessee pays for installation of the equipment;

E. The equipment does not provide for the removal of the broken egg shells from the immediate processing area;

F. A plant utilizing the automatic egg breaking equipment still finds it necessary to provide at least one supplemental hand breaking operation in order that personnel are continuously available to operate the automatic equipment in the event an operator fails to report for work or is sick.

For an egg breaking plant that has not attained an annual production volume in excess of 800,000 lbs., it is questionable, considering the annual minimum rental of the automatic equipment and the salaries of the two operators, whether the automatic equipment cost-wise per pound of produced broken eggs offers any savings in comparison to the hand breaking operation of this invention utilizing four individual operators to break the shell eggs in an eight hour shift when actual certified records of this invention as embodied structurally and utilizing four individual operators reveal that production of in excess of 7,500 lbs. of broken eggs is possible daily. Certainly, in the situation of the medium-size and small plants, this invention is highly competitive.

In comparison to the prior art discussion of hand breaking equipment in existence and automatic equipment in existence, this invention, by its structural incorporation of the principles of work simplification and motion economy, constitutes not only a vast improvement over hand breaking equipment, but also constitutes a competitive par to automatic egg breaking equipment but without the costs and maintenance problems of the automatic egg breaking equipment. This contention is substantiated by daily records of production kept of egg breaking operations with an inspector present from the New York State Department of Agriculture and Markets. In actual day by day operation of this egg breaking device and process, four individual operators sustain and maintain a production of 7,500 lbs. of broken per eight-hour working day. By use of the prior art hand breaking equipment, four operators in the course of an eight-hour breaking day achieve an average production record of 3,000 lbs. of eggs broken and rarely produce 4,000 lbs. of eggs broken. By use of the two-operator automatic egg breaking equipment of the prior art a production record of 6,000 lbs. of broken eggs per eight-hour day is achieved. However, in comparison of the structural embodiment of this invention to that of the automatic egg breaking equipment further factors must be considered and among these factors and without order of preference as to their enumeration are the following: (1) the two-operator automatic egg breaking equipment is complicated hardware renting annually for several times what it costs to fabricate the complete structural embodiment of this invention; (2) In the comparison of the two-operator automatic egg breaking equipment to the four-operator structural embodiment of this invention, there is an unknown factor to which attribution must be made when the automatic equipment mechanically breaks down of (a) production and resulting profit lost during shut down time, (b) standby wages that must be paid the two operators until repair of the automatic equipment and resumption of operation, (c) the cost of repair and replacement of parts of the automatic equipment; (3) the automatic egg breaking equipment with its complicated hardware requires substantially more time to clean and maintain in a sanitary state of operation whereas this structurally embodied invention is simple to clean and maintain in a sanitary state of operation; (4) the automatic egg breaking equipment does not provide for the efficient removal of the broken egg shells from the immediate processing area whereas this invention in its structural embodiment provides for efficient removal of the broken eggs shells as part of the process of the invention; and (5) the automatic egg breaking equipment neither integrates nor provides a work station for an inspector in a plant operating under one of the many state and federal government operated quality control programs whereas this structurally embodied invention integrates and provides such an inspector's work station as part of the process.

The aforementioned discussion of the prior art should facilitate the statement of the comparative objects of this invention by means of recapitulation and further digressive explanation, to wit: this structurally embodied invention substantially improves the efficiency and production of hand egg breaking in comparison to prior art egg breaking equipment and is competitive in comparison to automatic egg breaking equipment; this invention incorporates structurally a system of removing shells and other wastes from the immediate processing area; this invention permits the high standard of sanitation necessary in hand egg breaking to be maintained and/or improved; this invention permits small and medium-size egg breaking plants to purchase the structural embodiment of this invention rather than lease same thereby permitting the small and medium-size egg breaking plants to remain in business and in competition to the benefit of the national economy; and in contemplation and consideration of the benefits which accrue to the health and general welfare of the people by the imposition and maintenance of high standards of quality control and sanitation relating to the eggs removed from the shells by the federal government and the government of the several states, this invention integrates and provides for an inspector's work station in the event such structurally embodied invention is utilized in a egg breaking plant requiring such an inspector.

These objects, benefits and contributions to the art to which this invention apertains, as well as other objects, benefits and contributions to the art to which this invention apertains, will be discerned and appreciated by reference to the drawings wherein like reference numerals refer to similar parts throughout the several views, in which:

FIG. 3 is a perspective view of an operator's egg breaking station showing a breaking tray and knife, the centrally located collecting trough and a shell disposal chute;

FIG. 4 is a sectional view taken along the line 4—4 of FIG. 2;

FIG. 5 is a view of one of the adjustable standards for the centrally located collecting trough;

FIG. 6 is a view of a portion of one of the main table legs showing its adjustment feature;

It should be noted that in the preferred embodiment of the invention the choice of material is stainless steel because stainless steel is easy to clean for purposes of sanitation.

Figure 1:
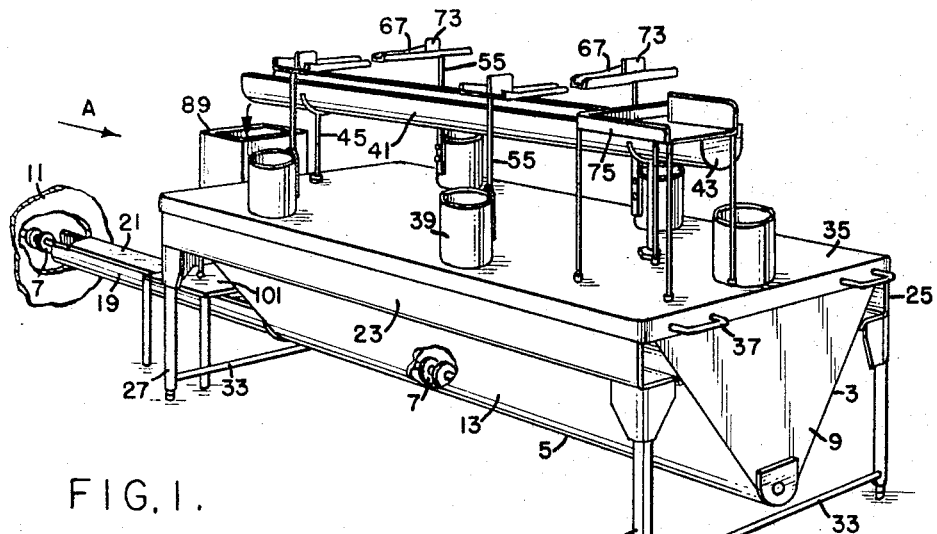
FIG. 1 is a perspective view of the invention.

In FIG. 1 of the drawings, reference numeral 1 generally refers to the invention. The table hopper bottom 3 which functions as a collecting trough for the broken eggs shells is configured in cross-section as an inverted, isosceles triangle whose apex is nose-coved as indicated at 5.

Disposed in the nose-coved portion 5 is an auger 7 driven by a conventional motor (not shown). Auger 7 is journalled in the right end wall 9 (as viewed in FIG. 1) of hopper bottom 3 and extends through an opening of the structural wall 11 of the egg breaking plant. Externally of the wall 11 auger 7 is cooperatively associated with a hammermill (not shown). It should be appreciated that broken egg shells or other egg waste disposed in hopper bottom 3 will, by gravity feed down the side walls 13 and 15 of the hopper bottom 3, move to the driven auger 7, and therefrom the broken egg shells or other egg waste will be conveyed to the hammermill.

Integral with the left end wall 17 (as viewed in FIG. 1) of the hopper bottom 3 is a shell-and-waste trough 19 of U-shaped configuration. Removably emplaced upon waste trough 19 is a cover 21.

Figure 9:
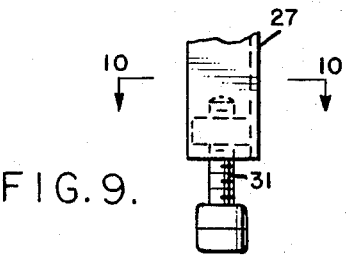
FIG. 9 shows one of the adjustable legs of the broken egg shell collecting hopper bottom.
Figure 10:
FIG. 10 is a view taken along the line 10—10 of FIG. 9.

Welded or otherwise suitably fixed in horizontal disposition to side walls 13 and 15 of table hopper bottom 3 are angle irons 23 and 25. Each of the angle irons 23 and 25 has at its terminal end portions in vertical disposition a leg 27 welded or otherwise suitably secured therewith. A portion of each leg 27 is configured as an angle iron as shown in FIGS. 9 and 10 and has a nut 29 secured therewith by welding. A screw 31 is engaged with nut 29 to permit vertical adjustment thereby of each leg 27. Welded or otherwise suitably fixed to two of the legs 27, as shown, are cross braces 33.

Removably emplaced over the top open portion of the hopper bottom 3 is a table top 35 having handles 37 welded or otherwise suitably fixed thereto to permit normal lifting of the table top 35 from the hopper bottom 3 and re-emplacement thereon. Welded or otherwise suitably secured to the table top 35 are five shell disposal chutes 39 configured as open cylinders.

Disposed longitudinally relative to and upon table top 35 is a centrally located broken egg collecting trough 41 of U-shaped configuration. Collecting trough 41 is open at its left end (as viewed in FIG. 1) while an end plate 43 of complemental configuration is welded or otherwise suitably fixed to the right portion of collecting trough 41. Collecting trough 41 is supported upon two standards 45, as shown. Each standard 45 has a vertically disposed rod 47 one end of which is threaded at 49 and the other end has welded or otherwise suitably fixed the trough supporting element 51 of semicircular configuration. With reference to FIG. 5 it should be discerned that each standard 45 is secured to the table top 35 by inserting the threaded portion 49 through a complemental hole formed in the table top 35 and thence effectuating securement by tightening nuts 53. Such securement of the standards 45 further permits adjustable horizontal disposition of the broken egg collecting trough 41 relative to the table top 35 for gravity feed along said broken egg collecting trough 41 of the broken eggs collected therein.

The arrangement and disposition of the shell disposal chutes 39 on the table top 35 spatially constitutes the four operators' work stations and the inspector's work station. A fifth operator's work station can be substituted for the inspector's station by substitution of an egg breaking tray as will be discernible from further description of the invention.

Each shell disposal chute 39 has two holes formed through its cylindrical wall. In vertical disposition with shell disposal chute 39 is an upstanding support standard 55 the lower end of which terminates in a flat strap 57 having six holes 59 formed therethrough and the upper terminal end of upstanding support standard 55 has transversely disposed in horizontal disposition a T-shaped egg breaking tray support element 61 welded or otherwise suitably fixed thereto. By reference to FIGS. 3 and 4 it should be discerned that vertical adjustment and disposition of the upstanding support standard 55 is afforded by the two round-head screws 63 and wing nuts 65 by selection and coincidental disposition of two adjacent holes 59 of the flat strap with the two holes formed in the shell disposal chute 39.

Figure 2:
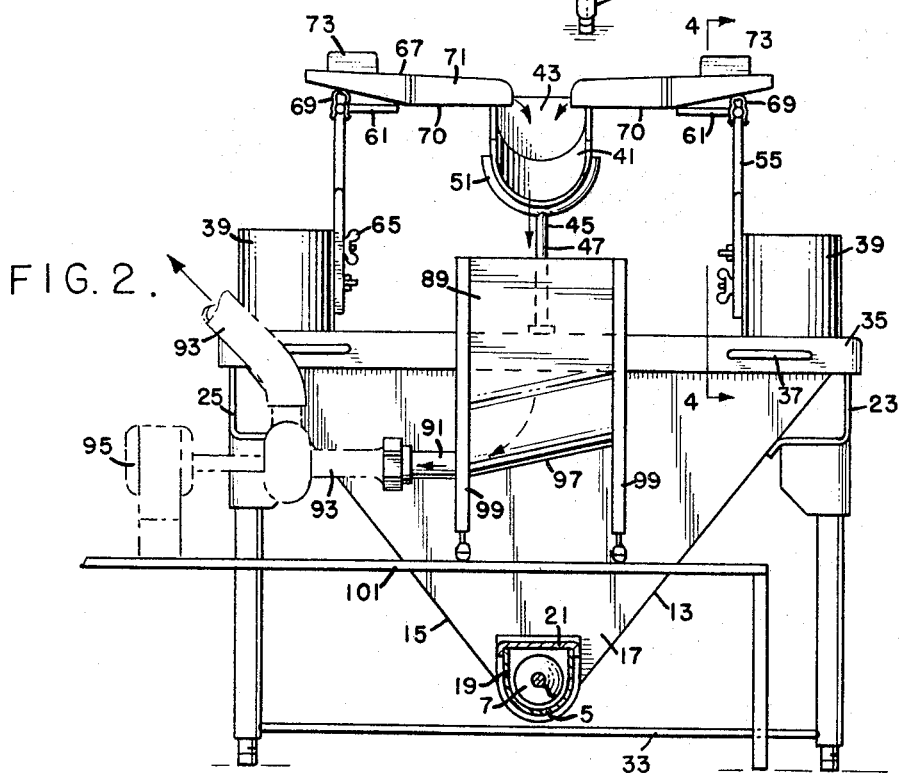
FIG. 2 is an elevational view looking in the direction of arrow A of FIG. 1.

Removably emplaced upon T-shaped support element 61 is an egg breaking tray 67 by means of two spring clips 69 depending from tray 67 and which spring clips are constructed to frictionally engage support element 61 for removable retention thereon. Tray 67 is configured, as shown, with a bottom 70 and converging upstanding lateral edges 71, as viewed from left to right in FIG. 3. As viewed in FIG. 2, the bottom 70 of tray 67 slopes downwardly in the portion thereof where the upstanding egg breaking knife or blade 73 is located and then the bottom 70 continues in substantially a horizontal disposition. The knife or blade 73 is disposed vertically and longitudinally relative to tray 67. It should be noted that a portion of the bottom 70 of the tray 67 rests upon the leg of the T-shaped support element 61.

The converged end of the tray 67 is arranged to be disposed over the collecting trough 41 in order that the broken eggs will move into the collecting trough 41. Eggs broken upon the knife 73 will move down that portion of the bottom 70 which is sloped downwardly. When the broken egg reaches that portion of the bottom 70 that is horizontal, the broken egg will stop moving. The horizontal portion of the bottom is configured to hold approximately three broken eggs. When three broken eggs lie upon the horizontal portion of the bottom 70 of tray 67, another egg broken on the knife or blade 73 will cause the egg nearest the converged end of tray 67 to move into the collecting trough 41 by reason of the fact that the fourth broken egg is lying upon the sloped downwardly portion of the bottom 70 where a condition of gravity flow exists thereby transferring lateral pressure to the other three broken eggs and thereby causing the first broken egg to move into the collecting trough 41.

It should be noted that each individual breaking tray 67 is vertically adjustable to the comfortable height required by each individual operator breaking eggs. The vertical adjustment of the breaking trays 67 is accomplished by vertical adjustment of the upstanding support standards 55 as described previously.

It is deemed that the structural embodiment of the egg breaking tray 67 is of patentable significance separate and apart from the main invention. The knife or blade 73 in its arrangement and disposition relative to the tray 67 permits the operator to emplace a supply of shell eggs to be stacked on each side of the egg breaking tray 67 because the operator can use both hands to break the eggs on the knife or blade 73 and dispose of the broken shells through the shell disposal chute 39 and into the table hopper bottom 3. The structural embodiment of the egg breaking tray 67 in conjunction with the invention minimizes the motion, work and effort of the operator in breaking the eggs and disposing of the broken shells. Perhaps by way of redundancy, by nevertheless stressing and substantiating the proclaimed objects and benefits attributed to the invention—the eggs broken on the knife or blade 73 flow as heretofore functionally described along the tray 67 and into the collecting trough 41 one egg at a time. It should be obvious that an operator not possessing amibidexterity would moreover substantially increase the production of broken eggs because the broken shells are released to fall through the shell disposal chute 39 with the minimum of motion effort, and after such release of the broken egg shells, the operator's hands are moving in the direction of the shell egg supply which structural and spatial accommodation is directly opposite to the inefficient hand egg breaking structure of the prior art. Then too, the operator individually is not required to collect and dispose of either the broken eggs or the broken egg shells separate and apart from the egg breaking operation, nor in addition to the egg breaking operation because these prior art additional requirements are unnecessary in this structurally embodied invention. In recapitulative essence, the structurally embodied invention maximizes the function timewise of the operator to break eggs because all the operator is required to do is to break eggs.

Further structural significance must be accorded the egg breaking tray 67 with its functionally associated bottom 70 and knife or blade 73. At times in the course of the egg breaking operation the operator will have a spoiled egg or bloody egg which is nevertheless broken. Because of the structural embodiment of the bottom 70 of the egg breaking tray 67 and the attributable functional fact that only the nearest egg to the collecting trough 41 can be released to the collecting trough 41 a safety factor is provided that a spoiled or bloody egg will not enter the collecting trough 41. This is because the operator is afforded visual inspection of the eggs broken by the necessity of three preceding broken eggs required to move the broken egg nearest the collecting trough 41 into same. When an operator breaks a spoiled or bloody egg, the operator simply removes the egg breaking tray 67 from the support standard 55, disposes of the broken eggs contained in tray 67 into the shell disposal chute 39, sanitizes the tray 67, replaces tray 67 upon the support standard 55 and the operator is prepared to commence the egg breaking operation.

Figure 7:
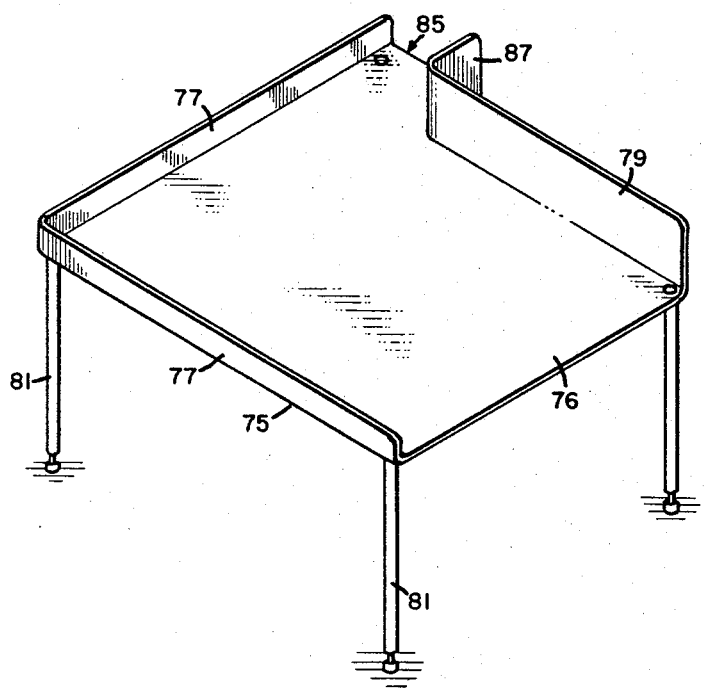
FIG. 7 is a perspective view of the inspector's table with its egg breaking edge and the adjustable legs supporting the table.
Figure 8:
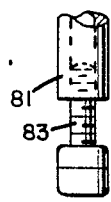
FIG. 8 is a view of one of the adjustable supporting legs for the inspector's table.

With reference to the inspector's table 75 shown in FIG. 7 and shown arranged and disposed in FIG. 1, the flat table part 76 thereof of substantially square or rectangular configuration with an upstanding lateral edge 77 along two sides. A removed L-shaped portion is removed from one side of table part 76 and upstanding therefrom is a lateral edge 79 which functions as a breaking knife or blade. Depending from table part 76 are four vertically adjustable legs 81 welded or otherwise suitably fixed to table part 76. An adjustable leg 81 is shown more discernibly in FIG. 8 and comprises a screw 83 engageable with the tapper hole in the bottom portion of the leg 81. The legs 81 are appropriately adjusted not only for the height convenience of the inspector but also adjusted such that the egg broken on the lateral edge 79 will slowly move by gravity feed towards the opening provided at 85 between the lateral edge 77 and the small leg 87 of the L-shaped lateral edge 79 into the broken egg collecting trough 41. It should be appreciated that by appropriate vertical adjustment of the legs 81, the inspector can preset the speed with which the broken egg will move upon the table part 76 and into the broken egg collecting trough 41. This feature of preset speed of movement of the broken egg by gravity feed not only allows the inspector to gauge his own time for further inspection and grading of sampled eggs, but also provides the safety factor of preventing a spoiled or bloody egg from moving into the broken egg collecting trough 41 because the inspector is afforded the opportunity for further inspection during the preset interval of time it takes for the broken egg to move upon the table part 76. In the event the inspector breaks a spoiled or bloody egg, the inspector can simply remove the inspector's table 75 from the table top 35 and position the opening 85 relative to the proximate shell disposal chute 39 in such a manner as to allow the spoiled or broken egg to drain into this proximate shell disposal chute 39. Thence the inspector would clean and sanitize the inspector's table 75, replace same on the table top 35 and the inspector would be ready to commence random sampling of the eggs to be broken by the individual operators.

It is deemed that the inspector's table 75 possess patentable significance separate and apart from the main invention because the inspector's table 75, with its table part 76 and the feature of preset speed of gravity movement of the broken egg to be inspected, can be utilized in conjunction with prior art egg breaking operations whether of the manual or automatic type.

The collecting trough 41 is vertically adjusted as previously described to permit gravity feed of broken eggs in the collecting trough 41 into a further broken egg collecting bucket 89 from which the eggs are pumped through an integral conduit 91 through connecting conduits 93 (shown in broken lines) by means of a sanitary pump 95 (shown in broken lines) for packaging of the broken eggs. The bottom 97 of collecting bucket 89 is disposed at an angle to facilitate flow of the broken eggs through the integral conduit union connected to the connecting conduits 93. The collecting bucket 89 has four adjustable legs 99 similar in construction to the leg 27 shown in FIGS. 9 and 10. Legs 99 rest upon a suitably arranged and disposed support 101.

It should be noted that the legs 27 of the table hopper bottom are appropriately adjusted to slope downwardly to the right (as viewed in FIG. 1) to facilitate the function of the driven auger 7 which further breaks up the broken shells along with conveying the broken shells and waste to the hammermill located external of the egg breaking plant.

It should further be appreciated that in the event the operator does not discover a spoiled or bloody egg broken and allowed to move into the broken egg collecting trough 41 there remains the further possibility that the spoiled or bloody egg will be discovered in the collecting trough 41 before being packaged. If the spoiled or bloody egg is discovered in the collecting trough 41, the egg breaking operation can be stopped, the spoiled or bloody egg and other eggs in the collecting trough 41 can be disposed of in one of the shell disposed chutes 39, the trough 41 can be cleaned and sanitized, and replaced and the egg breaking operation commence again.

Endorsed on the drawings are several arrows which indicated the flow pattern of the broken eggs 103 from the breaking trays 67 into the collecting trough 41 and then into the collecting bucket 89 for pumping through the integral conduit 91 and connecting conduits 93 for packaging. Also endorsed on the drawing is an arrow indicating the broken shell 105 is falling into the shell disposal chute 39.

An attribute of the extraordinary simplicity of this invention is the fact that cleaning up and sanitizing of the equipment is likewise extraordinarily simple and easy to effectuate. The egg breaking trays 67, inspector's table 75 and collecting trough 41 are merely removed for sanitizing. The fact that the table top 35 can be raised by grasping the handles 37 and disposing the table top 35 diagonally relative to the table hopper bottom 3 renders the hopper bottom 3 and auger 7 easy to sanitize. This attribute continues with respect to the collecting bucket 89 as well.

It is within the concept of this invention to structurally provide in excess of the four operator stations and inspector's station. Six, eight or ten operator stations can be structurally embodied and provided, for example, by correspondingly increasing the dimensional length of the table hopper bottom 3, table top 35, collecting trough 41, as well as providing the corresponding disposal chutes 39 and breaking trays 67 required.

Having thusly described our invention, we claim:

1. In an egg breaking apparatus for manually breaking eggs and for subsequently handling the eggs and waste products, the combination comprising:
- a table having a plurality of work stations around the perimeter of the table,
- a plurality of egg breaking trays for breaking eggs from their shells supported at each work station,
- an egg receiving trough positioned between the egg breaking trays and in communication with each tray to receive eggs from outlets of each tray, said trough being inclined throughout its length so that eggs received in the trough will be conveyed by gravity to an outlet end of said trough,
- waste disposal chutes positioned at each work station for receiving egg shells and other waste materials which are produced at each work station, and
- a hopper disposed beneath said table and in communication with said waste disposal chutes for receiving shells and waste products from the waste disposal chutes, said hopper including a driven auger at its bottom for removing accumulations of waste products from said hopper.

2. The combination of claim 1 and including an inspector's table placed on said table and in communication with said egg receiving trough whereby eggs may be inspected at said inspector's table and then conveyed to the egg receiving trough.

3. The combination of claim 2 wherein said inspector's table is inclined downwardly toward said egg receiving trough and wherein said inclination of the table is adjustable.

4. The combination of claim 1 wherein each waste disposal chute is positioned immediately adjacent to each egg breaking tray between said tray and the operator who is working at each of the work stations, whereby the operator may break the egg from its shell onto the tray and immediately drop the shell of the egg into the waste disposal chute before him.

5. The combination of claim 1 wherein said plurality of egg breaking trays is supported by upright standards, said upright standards being attached to said waste disposal chutes and said upright standards being vertically adjustable so that the egg breaking trays may be individually adjusted to heights suitable for the particular operators using the trays.

6. An egg breaking tray for breaking and inspecting eggs comprising:
- an elongate tray having a bottom portion and upstanding lateral side walls, said bottom portion having a first section for breaking eggs from their shells and a second section for receiving and holding the eggs broken from their shells for visual inspection, said second section having an outlet for ultimate transfer of the egg away from the tray after inspection;
- an egg breaking knife vertically disposed in said first section of the elongate tray and on the central longitudinal axis of the tray; and
- means for fastening said tray to a support said fastening means comprising spring clips attached to the under side of the tray bottom and which fasten said tray to a horizontal bar support for pivotal swinging movement about the axis of said bar support whereby the tray may be tilted to remove eggs from the first egg receiving section.

7. An egg breaking tray for breaking and inspecting eggs comprising:
- an elongate tray having a bottom and upstanding lateral side walls which converge toward an outlet end of said tray;
- a first section in said tray for breaking eggs from their shells, the bottom of said first section sloping downwardly toward the outlet end of said tray when the tray is supported in its operative position;
- a second section in said tray for receiving eggs broken into said first section, the bottom of said second section being on a horizontal plane when the tray is supported in its operative position, so that eggs received from said first section will be retained on the horizontal portion of the tray for visual inspection;
- an egg breaking knife vertically disposed in and permanently affixed to said elongate tray, said egg breaking knife being positioned in said first section of the elongate tray and on the central longitudinal axis of said tray so as to be perpendicular to the normal working position of an operator using the tray, said knife having an upper cutting edge and a lower edge which is permanently secured to the upper surface of the tray for the entire length of said lower edge, and mounting means for pivotally mounting said tray on a support.

8. An egg breaking tray for breaking and inspecting eggs comprising:
- an elongate tray having a bottom and upstanding lateral side walls which converge toward an outlet end of said tray;
- a first section in said tray for breaking eggs from their shells, the bottom of said first section sloping downwardly toward the outlet end of said tray when the tray is supported in its operative position;
- a second section in said tray for receiving eggs broken into said first section, the bottom of said second section being on a horizontal plane when the tray is supported in its operative position, so that eggs received from said first section will be retained on the horizontal portion of the tray for visual inspection, said second section including the outlet of the tray, whereby an accumulation of eggs in said first and second sections will push the egg nearest the outlet out of the tray through the outlet;
- an egg breaking knife vertically disposed in said first section of the elongate tray and on the central longitudinal axis thereof, said egg breaking knife having a cutting portion positioned in alignment with said longitudinal axis of the tray; and
- mounting means for pivotally mounting said tray on a support, said mounting means comprising spring clip fasteners for attaching said tray to a support having a horizontally disposed bar, whereby said tray may be tilted about the pivotal axis of said horizontal bar for removing undesirable eggs from said tray before such eggs can pass through the outlet of said tray.

References Cited

UNITED STATES PATENTS

| | | | |
|---|---|---|---|
| 966,933 | 8/1910 | Lewis | 146—2 |
| 1,494,602 | 5/1924 | Jenkins | 146—2 |
| 1,502,770 | 7/1924 | Frenier | 146—2 |
| 2,389,630 | 11/1945 | Mitton | 146—2 |
| 2,523,546 | 9/1950 | White | 146—2 |
| 2,815,055 | 12/1957 | Willsey | 146—2 |

WILLIAM W. DYER, JR., *Primary Examiner.*

JAMES M. MEISTER, *Examiner.*